(12) United States Patent
Lemm et al.

(10) Patent No.: US 9,362,011 B2
(45) Date of Patent: Jun. 7, 2016

(54) NUCLEAR REACTOR ASSEMBLY HAVING A CONNECTION BETWEEN A CONTROL ROD GUIDE TUBE AND A DRIVE HOUSING PIPE

(71) Applicant: AREVA GMBH, Erlangen (DE)

(72) Inventors: Andreas Lemm, Nuremberg (DE); Elayza Irak, Erlangen (DE); Benediktus Wintermann, Buckenhof (DE); Friedrich Leibold, Happurg (DE)

(73) Assignee: Areva GmbH, Erlangen (DE)

( * ) Notice: Subject to any disclaimer, the term of this patent is extended or adjusted under 35 U.S.C. 154(b) by 510 days.

(21) Appl. No.: 14/167,207

(22) Filed: Jan. 29, 2014

(65) Prior Publication Data

US 2014/0169514 A1 Jun. 19, 2014

Related U.S. Application Data

(63) Continuation of application No. PCT/EP2012/061069, filed on Jun. 12, 2012.

(30) Foreign Application Priority Data

Jul. 29, 2011 (DE) .......................... 10 2011 108 802

(51) Int. Cl.
*G21C 7/14* (2006.01)
*G21C 13/028* (2006.01)
*G21C 7/12* (2006.01)

(52) U.S. Cl.
CPC ................ *G21C 13/028* (2013.01); *G21C 7/12* (2013.01); *G21C 7/14* (2013.01); *Y02E 30/31* (2013.01); *Y02E 30/39* (2013.01)

(58) Field of Classification Search
CPC .......... G21C 7/12; G21C 7/14; G21C 13/028; Y02E 30/39

USPC .................................. 376/233, 353, 327, 203
See application file for complete search history.

(56) References Cited

U.S. PATENT DOCUMENTS

| 3,345,711 | A | 10/1967 | McCarthy | |
|---|---|---|---|---|
| 4,751,042 | A * | 6/1988 | Ales .......................... | G21C 7/00 376/353 |
| 5,329,563 | A | 7/1994 | Baversten | |
| 6,418,178 | B1 * | 7/2002 | Kobsa ..................... | G21C 7/113 376/233 |
| 6,501,813 | B1 | 12/2002 | Soma et al. | |

FOREIGN PATENT DOCUMENTS

| TW | 236028 B | 12/1994 |
|---|---|---|
| TW | 429380 B | 4/2001 |

OTHER PUBLICATIONS

International Search Report of PCT/EP2012/061069, Dated October 11, 2012.

\* cited by examiner

*Primary Examiner* — Jack W Keith
*Assistant Examiner* — Daniel Wasil
(74) *Attorney, Agent, or Firm* — Laurence A. Greenberg; Werner H. Sterner; Ralph E. Locher

(57) ABSTRACT

A boiling water reactor assembly includes a bayonet plate closure between a control rod guide tube and a drive housing pipe. The bayonet plate closure has a bayonet plate constructed in two parts including a central bayonet ring mounted rotatably about its longitudinal axis and an outer ring completely surrounding the bayonet ring. The outer ring is mounted on the periphery of the bayonet ring and reaches inwards under the bayonet ring periphery. The ring is furthermore permanently supported in the axial direction on the drive housing pipe by spring pressure acting on the control rod guide tube, in order to produce a frictional connection. The spring pressure can be released unhindered from the reactor side by tools.

8 Claims, 2 Drawing Sheets

NUCLEAR REACTOR ASSEMBLY HAVING A CONNECTION BETWEEN A CONTROL ROD GUIDE TUBE AND A DRIVE HOUSING PIPE

CROSS-REFERENCE TO RELATED APPLICATION

This is a continuation, under 35 U.S.C. §120, of copending International Application No. PCT/EP2012/061069, filed Jun. 12, 2012, which designated the United States; this application also claims the priority, under 35 U.S.C. §119, of German Patent Application No. DE 10 2011 108 802.8, filed Jul. 29, 2011; the prior applications are herewith incorporated by reference in their entirety.

BACKGROUND OF THE INVENTION

Field of the Invention

The invention relates to a boiling water nuclear reactor assembly having a bayonet plate closure providing a coaxially connection between a control rod guide tube (CRGT) and a drive housing pipe (DHP).

On one hand, a basic requirement is the specifically fixed bracing of the coupling of the CRGT on the DHP in order to prevent lifting of the CRGT and as a consequence thereof an undefinable bypass at the connection point. On the other hand, however, high demands must be met in terms of the mountability of the CRGT on the DHP. In boiling water reactors, specifically, the control rods required for controlling the power are guided beneath the reactor core in control rod guide tubes (CRGTs). It must be possible for those CRGTs, which are located at a great depth, to be removed without any problems, in order to reach regions of the lower plenum of the reactor vessel for servicing purposes. To that end, the CRGT locked by way of its foot plate to the respective DHP has to be unlocked and removed from the DHP. During the desired long operating times of the plant, however, deposits in the fittings of the joints lead to running difficulties, which complicate removal and make it very time-consuming. The removal is also made more difficult by the fact that the foot plates are located at a great depth (approximately 30 m) below the water level in the flooded reactor pool.

In order to reach those foot plates, it is known in the prior art, for example, to couple up to seven tool rods each 4 m long to one another in the axial direction, in order to fit, at the bottom end of that rod system, the actual locking and unlocking tool, which to that end engages into a bayonet ring plate mounted rotatably on the foot plate. Those problems are clearly explained, for example, in the introductory part of the description of German Utility Model DE 201 00 351 U1.

SUMMARY OF THE INVENTION

It is accordingly an object of the invention to provide a nuclear reactor assembly having a connection between a control rod guide tube and a drive housing pipe, which overcomes the hereinafore-mentioned disadvantages of the heretofore-known devices of this general type and which retains an operationally proven bayonet locking while at the same time improving its mountability that is consistently required for operation.

With the foregoing and other objects in view there is provided, in accordance with the invention, a control rod guide tube and a drive housing pipe connected coaxially thereto by a bayonet plate closure in a boiling water reactor, comprising an at least two-part form of a bayonet plate. The bayonet plate is formed of a central bayonet ring, mounted rotatably about the longitudinal axis thereof, in a conventional construction and operation as a carrier of bayonet grooves, additionally with an outer ring, which is mounted on the circumference or periphery of the bayonet ring. The configuration is such that the outer ring reaches inward underneath the circumference or periphery of the bayonet ring, and is supported on a base flange of the CRGT and therefore indirectly on the DHP with spring pressure acting permanently on the CRGT in the axial direction. The prestressed outer ring and the bayonet ring in this case form a kind of detachable coupling.

In order to unlock the CRGT, the spring pressure acting permanently on the outer ring on the part of the DHP during operation is eliminated by virtue of the fact that the outer ring is pushed down using a tool. By rotation, the bayonet ring can then be unlocked on one hand and locked again on the other hand in a stress-free manner. In the locked state, the bayonet ring presses the CRGT against the contact surfaces of the DHP with a defined force indirectly by way of the outer ring, and braces the CRGT to the DHP in a rotationally locked manner. This configuration reliably prevents "floating" of the CRGT, around which the reactor coolant flushes during operation, in all transient operating procedures. The spring element provided for producing the spring pressure, preferably in the form of a disk spring, surrounds the drive housing pipe with a radial sliding fit.

In order to ensure a seal at the contact, the mutual contact surfaces of the CRGT on the DHP advantageously have a planar (flat), conical envelope-like or crowned shape. The last two variants mentioned have the additional advantage of ensuring the absorption of lateral forces acting in the radial direction and thereby preventing undesired horizontal (lateral) movements of the CRGT with respect to the DHP.

The bayonet ring is mounted rotatably on the drive housing pipe with axial play. This play is compensated for in normal operation by the spring pressure acting permanently on the CRGT, and is permitted only for assembly or disassembly purposes by pressing down the outer ring using a tool suitable therefor.

The advantages achieved by the invention reside firstly in that the integration of a holding spring in the locking system makes it possible for the CRGT to be reliably braced to the DHP, in such a way that a secure installed position of the CRGT free of oscillation and movement is ensured in all operating states. On the other hand, the two-part bayonet plate provides a simple possibility for assembly, since the outer ring can be pressed down with an associated tool during unlocking and bracing and then the inner bayonet ring can be easily turned.

Other features which are considered as characteristic for the invention are set forth in the appended claims.

Although the invention is illustrated and described herein as embodied in a nuclear reactor assembly having a connection between a control rod guide tube and a drive housing pipe, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
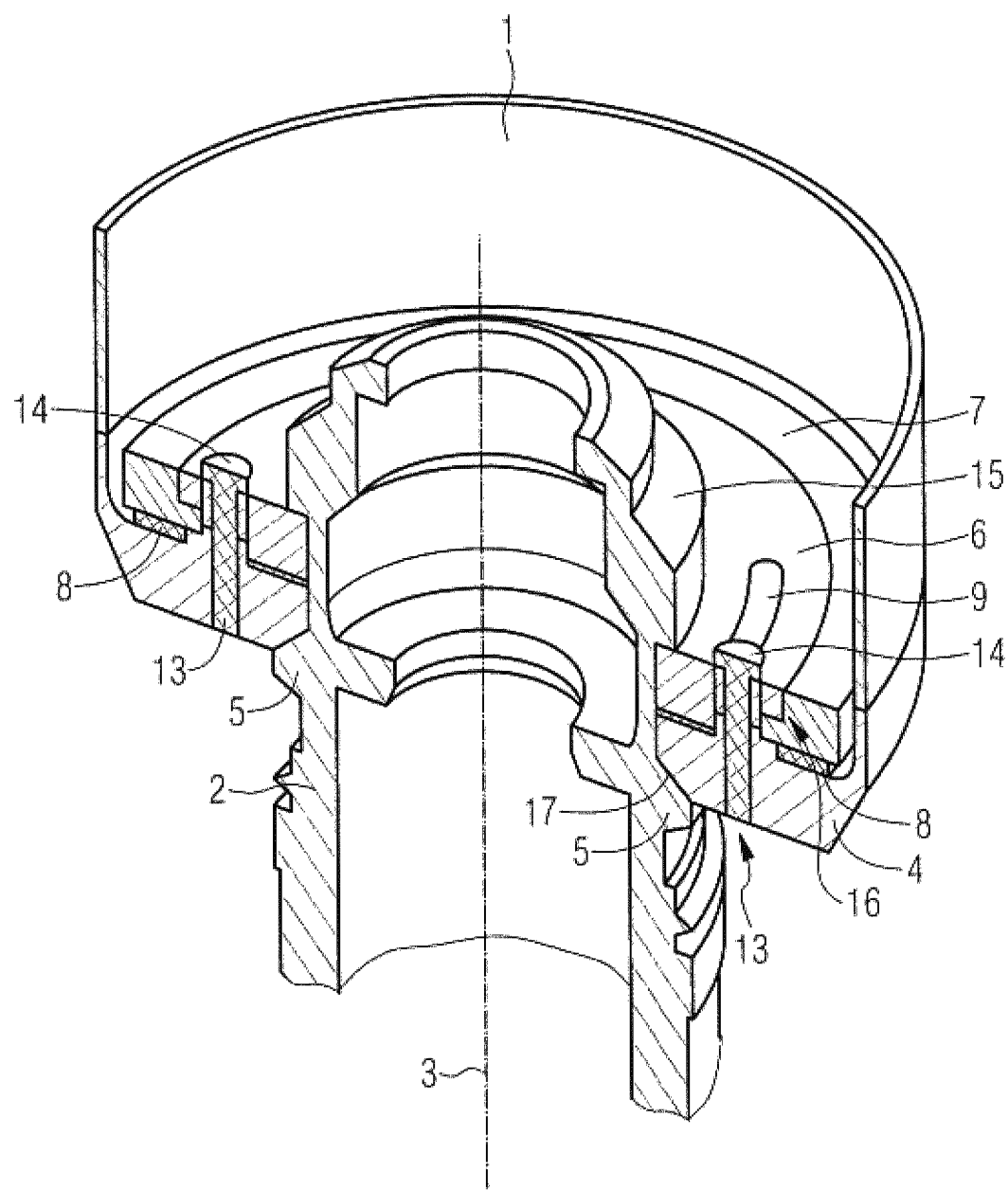
FIG. 1 is a diagrammatic, perspective, longitudinal-sectional view, running in axial direction, of a control rod guide tube (CRGT) and a drive housing pipe (DHP) of an assembly as a whole in a mounted state.

Referring now in detail to the figures of the drawings, which are simplified and diagrammatic, and first, particularly, to FIG. 1 thereof, there is seen a control rod guide tube (CRGT) 1 which surrounds a non-illustrated control rod of a reactor. The control rod is connected to a drive rod dipping vertically into a drive housing pipe (DHP) 2. The control rod, which is concentric with the vertical axis of the CRGT 1 and DHP 2 and dips from above downward into the CRGT 1, and the drive rod are themselves not shown, but rather are only indicated symbolically by a longitudinal axis 3.

The CRGT 1 has a base end remote from the reactor core with a base flange 4 extending inward in the direction of the longitudinal axis 3 of the DHP 2. The base flange 4 is coupled to an annular protrusion 5 of the DHP 2.

A conventional bayonet ring 6 and an outer ring 7 surrounding it according to the invention with a radial play fit and reaching underneath the outer periphery of the bayonet ring 6 with its inner periphery are positioned inside the CRGT 1 above its base flange 4 extending radially in the direction of the longitudinal axis 3 concentrically to the DHP 2. The outer ring 7 is therefore supported circumferentially on the base flange 4 of the CRGT 1, with the interposition of a disk spring 8 positioned concentrically with respect to the longitudinal axis 3. The disk spring 8 surrounds the DHP 2 with a radial sliding fit. The use of the disk spring 8 is suitable in the present case due to its small space requirement and large forces given small spring travels, which is why it is also used, as is known, preferably as a clamping element in apparatuses and tools. Common disk springs are annular disks shaped like a conical shell which can be subjected to loading in the axial direction. In the present case, the disk spring 8 surrounds the DHP 2 with a radial sliding fit.

Figure 2:
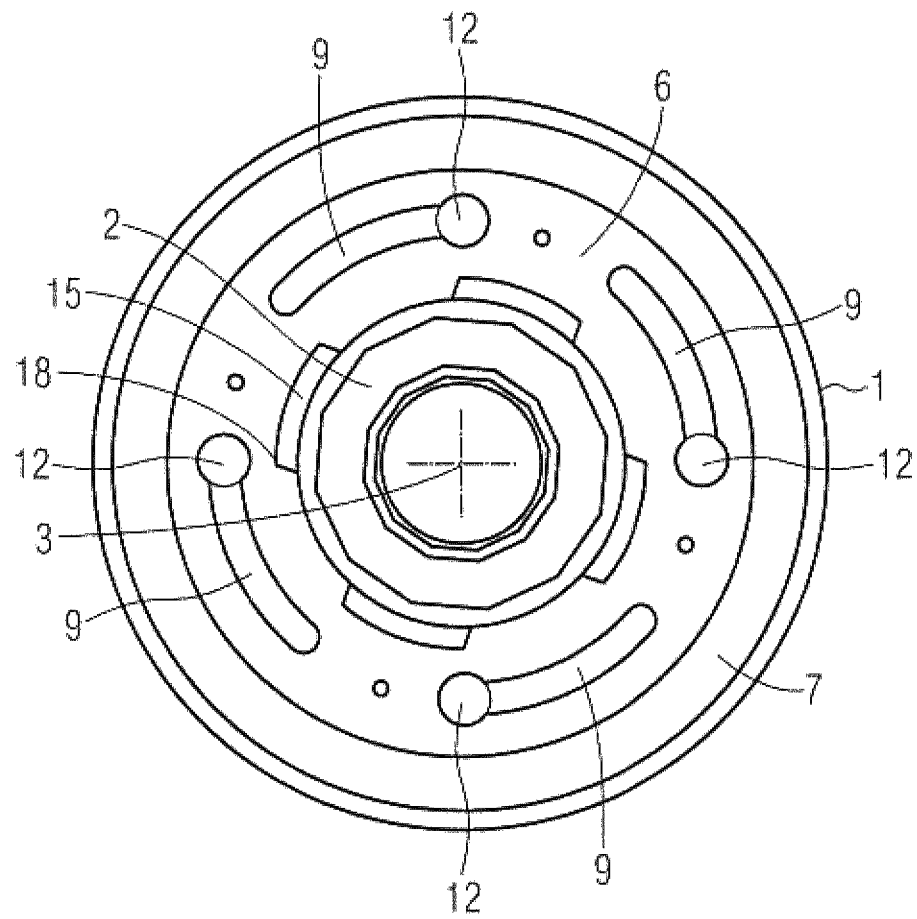
FIG. 2 is a plan view of the CRGT, taken in the direction of an arrow II in FIG. 1, inward in the direction of a central longitudinal axis of the DHP, directed from the outside inward in succession with an outer ring, a bayonet ring surrounded thereby and centrally with the drive housing pipe surrounded by the bayonet ring.
Figure 3:
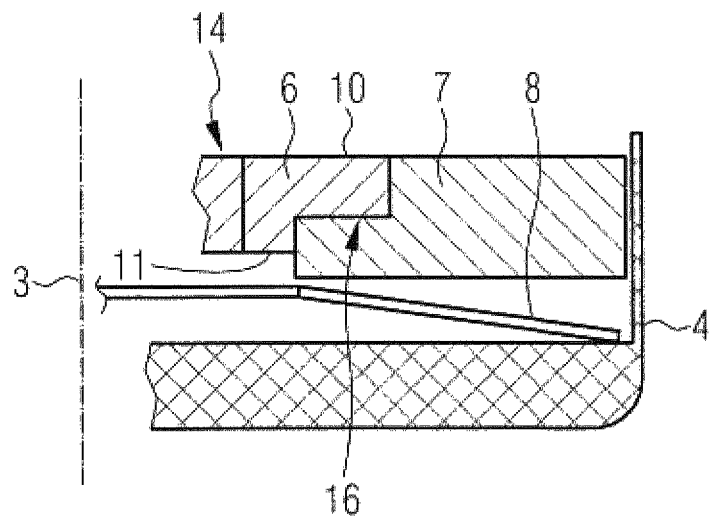
FIG. 3 is an enlarged, fragmentary, sectional view of a bearing of the bayonet ring on an inner annular step of the outer ring.

The operation of the present bayonet closure is known in principle from the commonly known structures. In the present case, too, the bayonet ring 6 has four annular or longitudinal slots 9 distributed uniformly over its circumference, which pass through the bayonet ring 6 parallel to the longitudinal axis 3 from a top side 10 thereof to an underside 11 thereof, as is seen in FIGS. 2 and 3. The circumferential course thereof lies on a circular arc made around the longitudinal axis 3 as a center point. The longitudinal slots 9 each end concordantly in the circumferential direction at one end in an insertion hole 12, also referred to as a locking bore, for a holding pin or fastening pin 13 assigned thereto in each case. The fastening pins 13, of which there are four in the exemplary embodiment, have shanks which run parallel to the longitudinal axis 3 of the control rod guide tube 2. They have free ends at the bottom which are fixed, for example screwed, in the base flange 4 in the assembled state. They also have ends which point upward in the direction of the CRGT 1 in the installed position, pass through the longitudinal slots 9 and are provided with radially widened locking heads 14 which, in the clamped or locked position outside the insertion holes 12 of the longitudinal slots 9, act upon a free surface of the bayonet ring 6 and, in a corresponding turned position of the DHP 2, act upon the bayonet ring 6 from above and brace it with a form-locking connection on the DHP 2, as long as an axial pressure of the disk spring 8 presses the outer ring 7 in the axial direction against the bayonet ring 6 and thereby fixes the turned position of the bayonet ring 6 (for rotation prevention).

In the locked position, the bayonet ring 6 is secured against displacement upward in the axial direction by radially outwardly protruding, cam-like retaining protrusions 15. In the exemplary embodiment, four retaining protrusions 15 are distributed uniformly over the circumference, are integrally formed at the head of the DHP 2 and reach inward over the bayonet ring 6. The retaining protrusions 15 therefore form top stops for the bayonet ring 6 mounted with axial play. Since the disk spring 8 is intended to spread apart the axial distance between the outer ring 7 of the bayonet plate and the annular base flange 4 of the CRGT 1, the bayonet ring 6 is pressed upward against the retaining protrusions 15 on one hand by way of an annular step 16. On the other hand, the base flange 4 of the CRGT 1 is pressed downward against a contact surface 17 of the annular protrusion 5 on the DHP 2 acting in the manner of a bottom stop, and therefore as a whole the CRGT 1 is fixed on the DHP 2. Suitable shaping of the contact surface 17 of the annular protrusion 5 (e.g. conical, round, like a crown) and of the bearing surface of the base flange 4 shaped complementarily thereto makes it possible to realize a desired seal in this region.

The fixing action can be eliminated from above through the CRGT 1 by applying pressure to the outer ring 7 using a suitable tool. As a result, the disk spring 8 is pressed together and tensioned, and the locking action of the bayonet closure generated thereby is thereby eliminated. The bayonet closure can then be unlocked without any problems. As can be seen best from FIG. 2, recesses 18 complementary to the retaining protrusions 15 at the head of the DHP 2 are located on the inner side of the bayonet ring 6 and are aligned in the unlocked state with the retaining protrusions 15, in such a way that the bayonet ring 6 can be lifted from the DHP 2 upward as required after the locking studs 13 have been removed. Since the base flange 4 of the CRGT 1 likewise has corresponding non-illustrated recesses, the CRGT 1 can be lifted completely from the DHP 2 in the unlocked state given a suitable turned position.

The invention claimed is:

1. A boiling water reactor assembly, comprising:
   a control rod guide tube having a base flange;
   a drive housing pipe having a longitudinal axis defining an axial direction; and
   a bayonet plate closure coaxially connecting said drive housing pipe to said control rod guide tube, said bayonet plate closure having a two-part bayonet plate including:
   a) a central bayonet ring mounted rotatably about said longitudinal axis and having bayonet grooves, an underside and a periphery, and
   b) an outer ring mounted on said periphery of said bayonet ring, said outer ring having a concentric annular step bearing and sliding on said periphery and on said underside of said bayonet ring and said outer ring:
      i) reaching inward underneath said periphery of said bayonet ring, and
      ii) being supported on said base flange of said control rod guide tube with spring pressure acting permanently on said control rod guide tube in said axial direction; and
   a disk spring configured to spread apart an axial distance between said bayonet ring and said base flange and apply pressure to a surface of said annular step in direction of said control rod guide tube.

2. The boiling water reactor assembly according to claim 1, wherein said disk spring surrounds said drive housing pipe with a radial sliding fit.

3. The boiling water reactor assembly according to claim 1, wherein said drive housing pipe has a tube shell and a contact surface protruding radially outwardly beyond said tube shell and having a planar shape, a conical shape or a surface with a crowned shape.

4. The boiling water reactor assembly according to claim 1, wherein said bayonet ring is braced axially while fitted on said drive housing pipe by an active spring pressure in a locked state of said bayonet plate closure.

5. A boiling water reactor assembly, comprising:
   a control rod guide tube having a base flange;
   a drive housing pipe having a longitudinal axis defining an axial direction; and
   a bayonet plate closure coaxially connecting said drive housing pipe to said control rod guide tube, said bayonet plate closure having a two-part bayonet plate including:
      a) a central bayonet ring mounted rotatably about said longitudinal axis and having bayonet grooves and a periphery, and
      b) an outer ring mounted on said periphery of said bayonet ring, said outer ring:
         i) reaching inward underneath said periphery of said bayonet ring, and
         ii) being supported on said base flange of said control rod guide tube with spring pressure acting permanently on said control rod guide tube in said axial direction; and
   radially outwardly protruding retaining protrusions integrally formed at a head of said drive housing pipe and configured to reach over said bayonet ring from inside in a locked state of said bayonet plate closure.

6. The boiling water reactor assembly according to claim 5, wherein said bayonet ring has an inner side, said bayonet grooves are recesses located on said inner side of said bayonet ring complementary to said retaining protrusions at said head of said drive housing pipe, and said recesses are configured to be aligned with said retaining protrusions in a unlocked state of said bayonet plate closure.

7. A boiling water reactor assembly, comprising:
   a control rod guide tube having a base flange;
   a drive housing pipe having a longitudinal axis defining an axial direction; and
   a bayonet plate closure coaxially connecting said drive housing pipe to said control rod guide tube, said bayonet plate closure having a two-part bayonet plate including:
      a) a central bayonet ring mounted rotatably about said longitudinal axis and having bayonet grooves and a periphery, and
      b) an outer ring mounted on said periphery of said bayonet ring, said outer ring:
         i) reaching inward underneath said periphery of said bayonet ring, and
         ii) being supported on said base flange of said control rod guide tube with spring pressure acting permanently on said control rod guide tube in said axial direction; and
   said bayonet ring being mounted rotatably on said drive housing pipe with axial play in an unlocked state of said bayonet plate closure.

8. A boiling water reactor assembly, comprising:
   a control rod guide tube having a base flange;
   a drive housing pipe having a longitudinal axis defining an axial direction; and
   a bayonet plate closure coaxially connecting said drive housing pipe to said control rod guide tube, said bayonet plate closure having a two-part bayonet plate including:
      a) a central bayonet ring mounted rotatably about said longitudinal axis and having bayonet grooves and a periphery, and
      b) an outer ring mounted on said periphery of said bayonet ring, said outer ring:
         i) reaching inward underneath said periphery of said bayonet ring, and
         ii) being supported on said base flange of said control rod guide tube with spring pressure acting permanently on said control rod guide tube in said axial direction; and
   fastening pins having locking heads, reaching through said bayonet ring and configured to prevent rotation of said bayonet ring in a locked state of said bayonet plate closure.

* * * * *